July 31, 1951 C. C. BALDWIN 2,562,689
SCREW AND NUT TRANSMISSION
Filed June 21, 1948
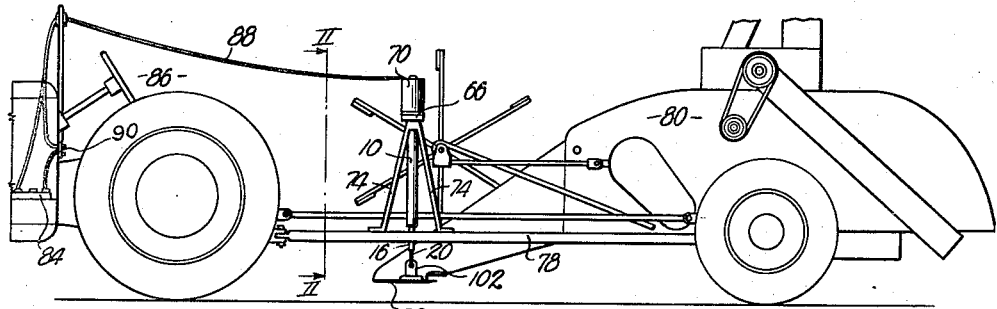
Fig. 1.
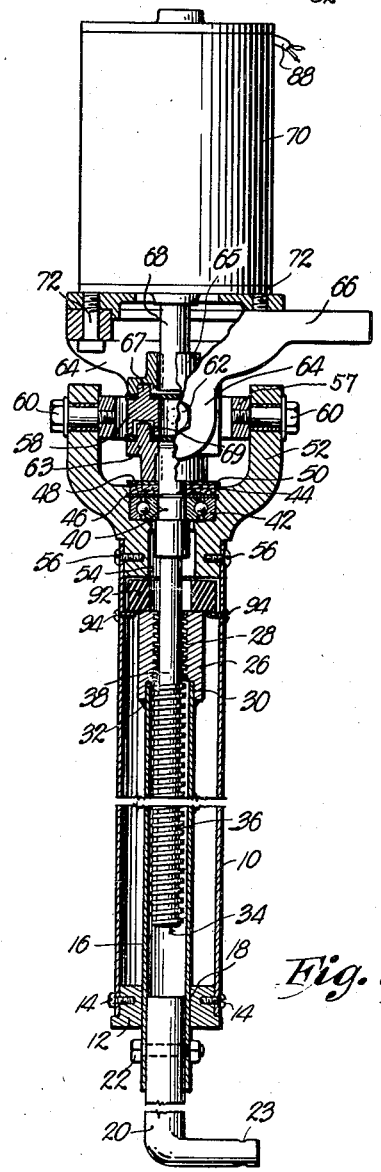
Fig. 3.
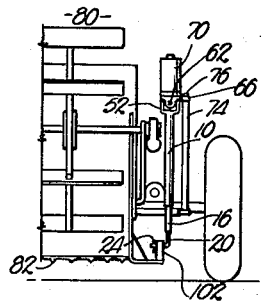
Fig. 2.
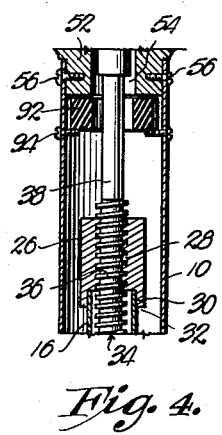
Fig. 4.
INVENTOR.
Curtis C. Baldwin
BY
ATTORNEY.

Patented July 31, 1951

2,562,689

UNITED STATES PATENT OFFICE 2,562,689

SCREW AND NUT TRANSMISSION

Curtis C. Baldwin, Wichita, Kans., assignor to
C. Earl Hovey, trustee

Application June 21, 1948, Serial No. 34,249

2 Claims. (Cl. 74—424.8)

This invention relates to equipment for farm implements such as combines, having a cutter bar swingable to and from various positions above the ground, and in the nature of mechanism for raising and lowering such cutter bar automatically upon electric push button control by the operator.

This is a continuation in part of my co-pending application, Serial No. 744,512, filed April 28, 1947, and entitled "Raising and Lowering Mechanism for Cutter Bars," now abandoned.

The apparatus of my said former application has proved entirely operable and for the most part satisfactory in commercial use, but is not as versatile in movement nor as perfect in continued, trouble-free use as necessary in its field.

It is the most important object of this invention, therefore, to improve upon the device of my aforementioned disclosure, by rendering the same freely swingable through intersecting horizontal axes, thereby eliminating any binding whatsoever of its component parts as the cutter bar is actuated.

Another important object of this invention is to provide a cutter bar control assembly that becomes inoperable automatically at one point in its cycle to prevent damage thereto when the operator fails to carefully limit the extent of its operation by his fingertip control.

A further object of this invention is to provide a cutter bar control of the type shown in my said co-pending application having means for preventing binding and locking of the relatively reciprocable parts thereof, particularly when the cutter bar has been moved to the uppermost limit of its path of travel.

Other objects include the particular assembly and arrangement of parts necessary to attain the objects above set forth, all of which will be made clear as the following specification progresses.

In the drawing:

Fig. 1 is a side elevational view of an electric lift for farm implement cutter bars made in accordance with my present invention, showing the same operably mounted on a such implement.

Fig. 2 is a normally front elevational view thereof taken on line II—II of Fig. 1.

Fig. 3 is an enlarged, fragmentary side elevational view thereof, parts being in vertical cross section to reveal details of construction; and, Fig. 4 is a fragmentary cross sectional view similar to that shown in Fig. 3, showing the parts thereof in a position where the cutter bar would be partially lowered.

An elongated tubular member 10 is disposed with its longitudinal axis substantially vertical and has its lowermost end closed by a plug 12 held in place by screws or the like 14, and by an elongated tube 16 slidably mounted in an opening 18 within plug 12. That end of tube 16 extending below plug 12 has one leg of an L-shaped link 20 telescoped therein, the latter being held in place by a transverse bolt 22 passing through tube 16 and link 20. An opening 23 in the other leg of link 20 removably receives a cotter key or the like 24.

A follower block 26 provided with a tapped bore 28 and an enlarged cavity 30 co-axial with bore 28, is telescoped over the uppermost end of tube 16 within hollow member 10, and is held in place by welding or the like as at 32. Thus, bore 28 of block 26 is also in co-axial alignment with tube 16.

An elongated screw 34 is provided with threads 36 at one end thereof and extends through block 26 into the uppermost end of tube 16. A length 38 of screw 34 intermediate its ends is of reduced diameter and void of threads. That end of screw 34 opposite to threads 36 is reduced as at 40 and journalled in a bearing 42, an annular groove 44 in this portion 40 receiving a retainer ring 46 overlying the bearing 42. A packing ring 48 and a metallic washer 50 are respectively superimposed over ring 46.

A U-shaped bracket 52 having an opening 54 for receiving screw 34 registers with member 10 and is held in place by screws 56, the uppermost end of opening 54 receiving bearing 42. A ring 57 between the legs of bracket 52 is secured to bracket 52 by opposed pinions 60 and by pinions 62 to spaced downturned legs 64 of a second bracket 66.

A collar 63 is keyed to the uppermost end of screw 34 and a second collar 65 is keyed to the lowermost end of a vertical drive shaft 68 of a prime mover 70. Lugs 67 on a floating member 58 loosely interlock with aligned cavities in the collar 65 and lugs 67 on collar 63 fit loosely in corresponding cavities formed in the member 58.

The prime mover 70, constituting a reversible electric motor, is secured directly to bracket 66 by bolts 72 and bracket 66 is attached to the uppermost end of a standard 74 by bolts 76. Standard 74 is mounted on framework 78 of implement 80 directly above cutter bar 82 thereof and adjacent one end of the latter.

Any source of electric energy for driving motor 70 may be used, such as a battery 84 on tractor 86. Lines 88 join battery 84 and motor 70, and a pair of switches 90 on the instrument panel of tractor 86 are easily accessible to the operator.

A resilient stop or bumper 92 made from rubber or the like underlies the bracket 52 in member 10 in circumscribing relation to screw 34 and is held in place in any suitable manner, as by screws 94 extending into member 10.

The horizontal leg of link 20 is loosely journalled in an upstanding bracket 102 on the cutter bar 82 and key 24 prevents displacement.

In operation, when the parts above described are in the position shown in Fig. 3, one of the switches 90 is closed for energizing motor 70 to rotate screw 34 in a direction for lowering cutter bar 82. When the position desired for cutter bar 82 is reached, as for instance as shown in Fig. 4, the one switch 90 is opened to deenergize motor 70.

When the other switch 90 is held closed, motor 70 will raise following block 26 to the position shown in Fig. 2, where it will contact resilient bumper 92 at the uppermost end of its path of travel, preventing locking of its threads 28 with threads 36 of screw 34, as would otherwise be the case if a rigid stop were used in lieu of bumper 92.

Also, the threads 28 of block 26 become disengaged with threads 36 of screw 34 when in the position shown in Fig. 3, because of the portion 38 of screw 36. Thus, even if motor 70 continues to rotate when block 26 reaches bumper 92, no damage will occur because screw 34 will rotate freely without further actuation of block 26, tube 16 and cutter bar 82.

It is seen that as the cutter bar 82 is raised and lowered and when it swings arcuately as is conventionally true with implements such as shown at 80, the member 10 and all its associated parts will swing as a unit as link 20 turns in bracket 102.

The other direction of swinging movement of member 10, as provided for by pinions 62, compensates for any failure of cutter bar 82 to swing in a truly vertical path of travel. The loose fit between link 20 and bracket 102 permits such swinging movement of member 10 and no binding with resultant damage to various parts of the assembly will occur.

Thus, as implement 80 moves over rough terrain, twisting, turning and buckling into many positions, the mechanism above described will operate efficiently with ease and precision, there being no binding of any parts thereof whatsoever.

Having thus described my invention, what is claimed as new and desired to be secured by Letters Patent is:

1. In a power device of the kind described, a frame; a member swingably carried by the frame; a support pivotally carried by the member for swinging movement on an axis perpendicular to the swinging axis of said member on the frame; a prime mover mounted on the frame and having a rotatable drive shaft extending toward the member; a rotatable driven shaft mounted on said support for swinging movement therewith, said shafts being normally in coaxial alignment; structure operably connected with said driven shaft for reciprocable movement as the latter rotates; and mechanism interconnecting said drive shaft with the driven shaft for rotating the latter as the prime mover is energized and as the member and the support swing on their respective axes.

2. In a power device of the kind described, a frame having a pair of spaced-apart legs depending therefrom; a ring swingably carried by the frame between said legs; a yoke embracing the ring and pivotally carried thereby for swinging movement on an axis perpendicular to the swinging axis of said ring on the frame; a prime mover mounted on the frame and having a rotatable drive shaft; a rotatable driven shaft mounted on said yoke for swinging movement therewith, said shafts being normally in coaxial alignment; structure operably connected with said driven shaft for reciprocable movement as the latter rotates; a coupling member between the drive shaft and the driven shaft within said ring; and interconnecting said shafts for simultaneous rotation upon energization of the prime mover, said coupling member being rockable relative to the shafts as the driven shaft swings with respect to the driven shaft.

CURTIS C. BALDWIN.

REFERENCES CITED

The following references are of record in the file of this patent:

UNITED STATES PATENTS

| Number | Name | Date |
|---|---|---|
| 662,484 | Ziehl | Nov. 27, 1900 |
| 1,294,697 | Page | Feb. 18, 1919 |
| 2,004,298 | Shoemaker | June 11, 1935 |
| 2,135,621 | Millard | Nov. 8, 1938 |
| 2,320,953 | Shenstone | June 1, 1943 |
| 2,410,918 | Acton | Nov. 12, 1946 |
| 2,420,219 | Baldwin | May 6, 1947 |
| 2,424,492 | Morris | July 22, 1947 |